E. E. WINKLEY.
DRIVING AND STOPPING MECHANISM.
APPLICATION FILED JAN. 6, 1911. RENEWED FEB. 17, 1915.

1,197,704.

Patented Sept. 12, 1916.
2 SHEETS—SHEET 1.

Witnesses:
Powell F. Hatch
K. D. McPhail

Inventor:
Erastus E. Winkley
by Phillips Van Everen & Fish
Attys

E. E. WINKLEY.
DRIVING AND STOPPING MECHANISM.
APPLICATION FILED JAN. 6, 1911. RENEWED FEB. 17, 1915.

1,197,704.

Patented Sept. 12, 1916.
2 SHEETS—SHEET 2.

Witnesses:
Powell F. Hatch
K. D. McPhail

Inventor:
Erastus E. Winkley
by Phillips Van Everen & Fish
Attys

UNITED STATES PATENT OFFICE.

ERASTUS E. WINKLEY, OF LYNN, MASSACHUSETTS.

DRIVING AND STOPPING MECHANISM.

1,197,704.   Specification of Letters Patent.   Patented Sept. 12, 1916.

Application filed January 6, 1911, Serial No. 601,194. Renewed February 17, 1915. Serial No. 8,887.

*To all whom it may concern:*

Be it known that I, ERASTUS E. WINKLEY, a citizen of the United States, residing at Lynn, in the county of Essex and State of Massachusetts, have invented certain new and useful Improvements in Driving and Stopping Mechanism; and I do hereby declare the following to be a full, clear, and exact description of the invention, such as will enable others skilled in the art to which it appertains to make and use the same.

The invention relates to driving and stopping mechanism adapted for use upon machines in which the operating parts are comparatively heavy and are driven at a high or variable rate of speed. It has heretofore been customary to provide machines of this character with mechanism for stopping the machine at a definite point in the cycle of operations performed by the operating parts, and in case of high speed machines, friction brake mechanism has been provided for overcoming to a greater or less degree the momentum of the parts. These devices have not proved satisfactory, however, owing to the unavoidable variation in the action of the friction brake mechanism and the resulting shock and wear upon the devices which finally arrest the movement of the driven parts.

It is the object of the present invention to provide a construction which will enable the parts, even when driven at a high or variable rate of speed, to be arrested in a uniformly reliable manner without undue shock and wear, and without danger of injury to the devices which finally position the driven parts. To this end the invention consists in the features of construction and combination of parts hereinafter described and referred to in the claims, the advantages of which will be apparent to those skilled in the art.

The various features of the invention will be readily understood from an inspection of the accompanying drawings and the following detailed description of the mechanism shown therein.

Figure 1:
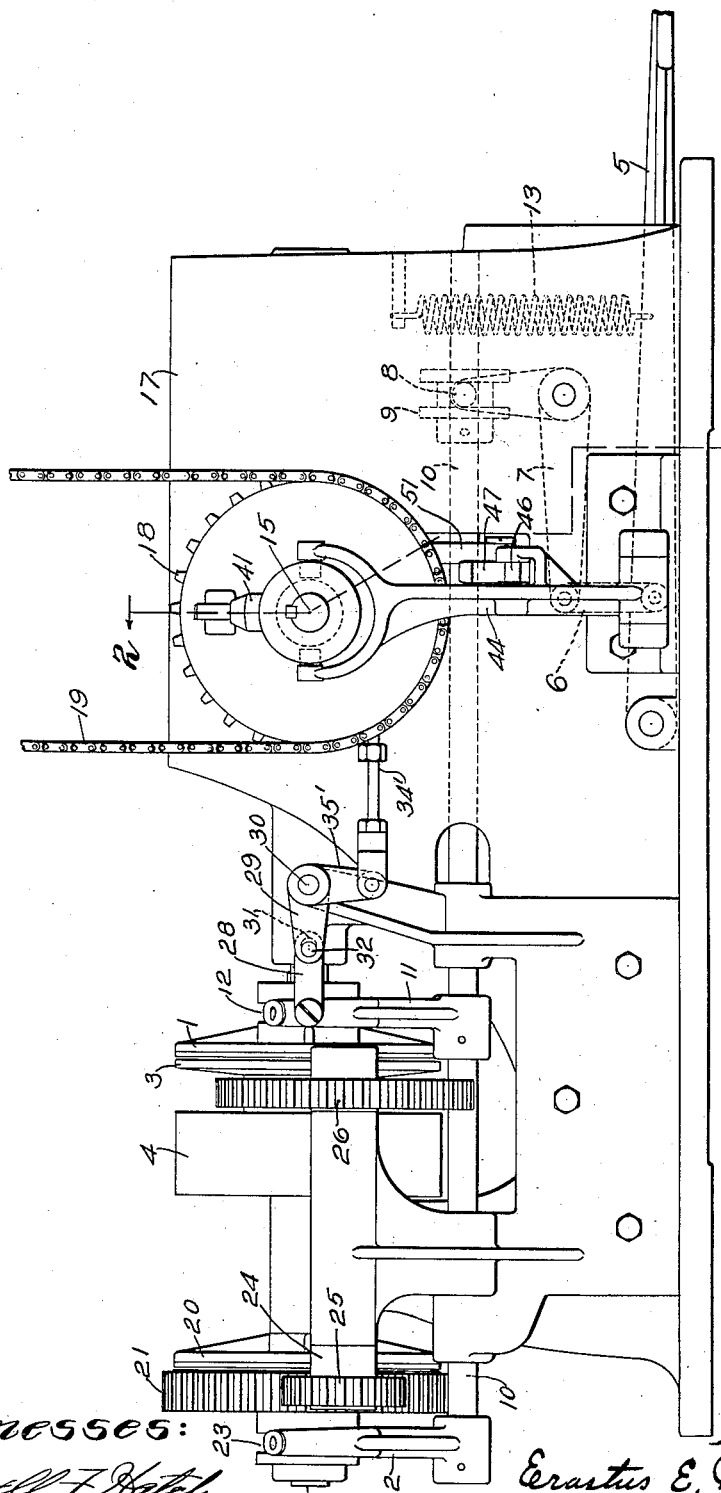
Figure 2:
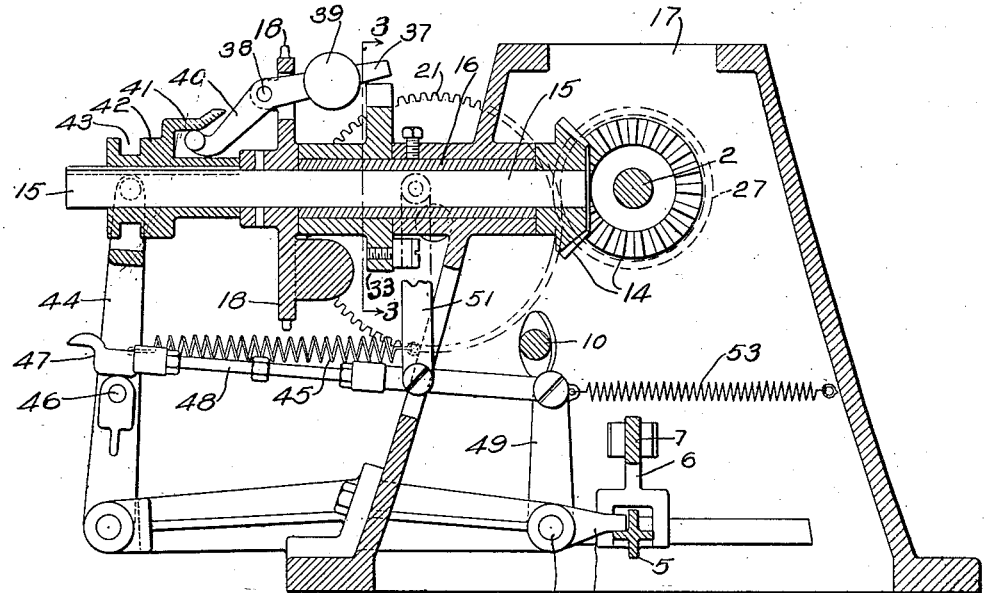
Figure 3:
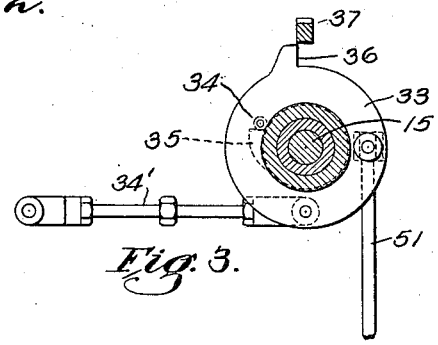
Figure 4:
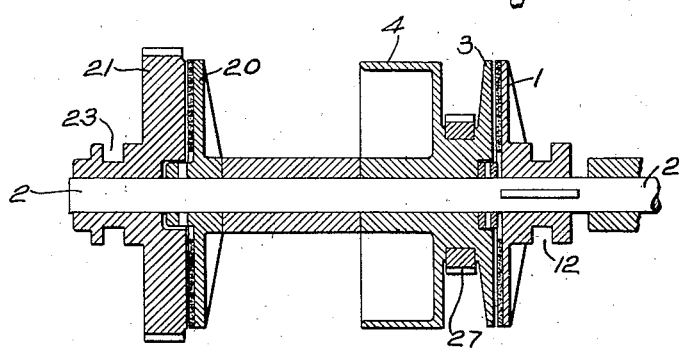

In the drawings Figure 1 is a side elevation of a mechanism embodying the invention in its preferred form; Fig. 2 is a vertical transverse section on line 2—2, Fig. 1; Fig. 3 is a sectional detail on line 3—3, Fig. 2; and Fig. 4 is a vertical longitudinal section through one end of the driving shaft.

As shown in the drawings, the parts of the machine to be operated are driven through a main driving clutch, one member of which consists of a friction disk 1 keyed to rotate with and slide upon a shaft 2. The other member of the clutch consists of a disk 3 formed on the hub of a driving pulley 4 and arranged to coöperate with the friction disk 1. The pulley is loosely mounted on the shaft, and the driving clutch is engaged or disengaged by movement of the disk 1. Movement is imparted to the disk 1 through a treadle 5 which is connected by means of a link 6 with one arm of a bell crank lever 7, the other arm of which carries pins 8 engaging an annular groove formed in a sleeve 9 which is secured to a clutch operating rod 10. The rod 10 carries an arm 11, the end of which is provided with pins engaging an annular groove 12 formed in the hub of the disk 1. A spring 13 is connected to the treadle and acts to normally force the rod 10 in a direction to disengage the members of the driving clutch. By depressing the treadle the operator may engage the members of the driving clutch, and by varying the pressure on the treadle he may control the pressure between the members of the clutch to vary the speed imparted to the shaft 2 and to the parts driven therefrom. The shaft 2 is connected through beveled gears 14 with a transverse shaft 15 which is journaled in a sleeve 16 secured in the base 17 of the machine. Motion is transmitted to the operating parts of the machine mounted upon the base 17 through a sprocket wheel 18 pinned to the shaft 15 and connected through a sprocket chain 19 with the cam shaft or other shaft of the driven machine.

So long as the treadle 5 is depressed the machine is driven through the main driving clutch at a speed depending upon the pressure with which the operator forces down the treadle. When the machine is to be stopped the operator releases the treadle and the driving clutch is disengaged or, thrown out of operation. At the same time a second slow uniform speed clutch is thrown into operation, and in case the machine is running at a high rate of speed at the time the clutch is released, this second clutch first reduces the speed and then continues the movement of the driven parts at a comparatively slow speed. At the same time mechanism is thrown into operation which throws out the uniform speed or speed reducing clutch and stops the driven parts, and this mechanism is so constructed that it remains inactive until the speed of the driven parts has been reduced to a certain point or to the speed which is imparted to them through the uniform speed clutch. When the speed is reduced to a predetermined point this mechanism is rendered active and acts to disengage the uniform speed clutch to arrest the motion of the driven parts with the machine at a definite point in its cycle of operations. The reduction of the speed of the machine to a point where the stop mechanism may operate in a reliable and efficient manner and without danger of injury to the mechanism or to the machine is insured before the stop mechanism is rendered active, and the machine is stopped while being driven at a uniform slow speed whatever its speed when the main drive is thrown out.

In the construction shown the slow speed clutch for reducing the speed or continuing the movement of the driven parts after the driving clutch is thrown out of operation consists of a friction disk 20 secured to the shaft 2 and arranged to be engaged by the face of a gear 21 which is loosely mounted on the shaft. The gear 21 is connected with the clutch operating rod 10 through an arm 22, the end of which is provided with pins engaging an annular groove 23 formed in the hub of the gear. The gear 21 is driven at a comparatively slow speed from the driving pulley 4 through a quill gear 24 which is provided at one end with a small gear 25 engaging the gear 21 and at the other end with a large gear 26 engaging a small gear 27 on the hub of the pulley. When the machine is at rest the clutch operating rod 10 is held in position against the tension of the spring 13 with both clutches out of engagement by a toggle latch one link 28 of which is pivoted to the clutch arm 11 and the other link 29 of which is secured to a rock shaft 30. The link 28 is slotted at 31 to give a certain amount of lost motion at the pivotal joint 32 between the toggle links, so that the toggle will not interfere with the movement of the clutch disk 1 into engagement with the disk 3 when the operator depresses the treadle. When the operator depresses the treadle the toggle is broken through its connection with the stop mechanism to be described, so that it will not interfere with the movement of the clutch rod 10 toward the right in Fig. 1 when the treadle is released in stopping the machine, and will not therefore interfere with the engagement of the slow speed clutch members 20 and 21. The toggle is straightened to disengage the slow speed clutch members through the operation of the stop mechanism, as will be presently described.

The mechanism for disengaging the slow speed clutch and stopping the machine comprises a stop disk 33 which is loosely mounted on the end of the sleeve 16 and is provided with a laterally projecting pin 34 adapted to engage a stop lug 35 formed on the bearing in which the sleeve is secured. The stop disk is also provided with a shoulder 36 arranged to be engaged by a stop arm or pawl 37 carried by the sprocket wheel 18. The stop arm is pivoted at 38 upon the sprocket wheel, and is provided with a weight 39 which acts as a governor to hold the arm or pawl out of position to engage the shoulder 36 on the stop disk so long as the sprocket wheel rotates above a certain speed. When the speed of the sprocket wheel, and therefore of the driven parts, falls below a certain point, depending upon the governor weight 39, the arm 37 will swing in toward the shaft 15 and will strike against the shoulder 36. The stop disk will now be turned until the pin 34 engages the shoulder 35, when the rotation of the sprocket wheel and driven parts will be arrested. The movement which is imparted to the stop disk 33 at this time operates to straighten the toggle links 28 and 29 and thus disengage the slow speed clutch members 21 and 20. For this purpose the disk 33 is connected through an adjustable link 34' with an arm 35' secured to the rock shaft 30.

The movement of the stop disk 33 also serves to disengage the stop pawl 37 from the shoulder 36 on the stop disk, so that the sprocket wheel and driven parts are free to be rotated through the main driving clutch when the treadle is again depressed. The devices for thus disengaging the stop pawl and subsequently releasing it when the treadle is released so that it may reengage the shoulder 36, are as follows: The stop pawl or arm 37 is provided with a tail piece 40 arranged to be engaged by a cam plate 41 formed on a sleeve 42 which is keyed to rotate with and slide longitudinally on the shaft 15. The sleeve is provided with an annular groove 43 which is engaged by pins carried by the upper end of a yoke lever 44. The lever is forced in a direction to engage the cam plate with the tail piece 40 of the stop pawl by a spring 45. The lever is provided with a pin 46 adapted to be engaged by a shoulder 47 formed on the free end of a latch rod 48. The rear end of the latch rod is pivotally supported on an arm 49 which is secured to a rock shaft 50. The latch rod is connected by a link 51 with the disk 33, so that the free end of the rod is normally above the pin 46, as indicated in Fig. 2. The rock shaft 50 is provided with an arm 52 arranged to engage the upper side of the treadle 5, and a spring 53 is connected to the arm 49 and tends to hold the arm 52 in engagement with the treadle and to move the latch rod toward the right.

When the machine is at rest the parts are in the position indicated in the drawings. When the operator depresses the treadle to engage the driving clutch, the pressure on the pivotal connection of the toggle links 28 and 29 is released, and the weight of the parts connected with the stop disk 33 rocks the disk slightly, thus breaking the toggle and also dropping the free end of the latch rod 48 so that the shoulder 47 rests back of the pin 46, the downward movement of the treadle having allowed the arm 49 to move toward the right and bring the shoulder 47 to the rear of the pin 46. When the treadle is released it is moved upward by the spring 13, thus engaging the slow speed clutch members. This movement of the treadle also rocks the shaft 50 and forces the latch rod 48 toward the left, thus disengaging the cam plate 41 from the tail 40 of the stop pawl arm 37. The stop pawl arm is now free to swing inward, but is held in its outer position by the rotation of the governor weight 39 until the speed of the driven parts falls sufficiently to allow the weight to move inward. If the parts are being driven at a high rate of speed when the treadle is released, the clutch members 20 and 21 will act as a friction brake to gradually overcome the momentum of the parts until the speed of the driven parts is the same as the speed of the gear 21, after which the clutch members will act to continue the movement of the driven parts. When the speed is sufficiently reduced the stop pawl 37 will engage the shoulder 36 on the stop disk and rock the disk until its movement and the movement of the driven parts is arrested by the engagement of the pin 34 with the shoulder 35. This movement of the disk straightens the toggle links 28 and 29, as above described, and disengages the slow speed clutch members. The movement of the disk also raises the latch rod 48, thus disengaging the shoulder 47 on the rod from the pin 46, so that the spring 48 may immediately slide the sleeve 42 toward the right and thus disengage the stop pawl from the shoulder on the stop disk. The parts are now in normal position with the parts of the driven machine in a position determined by the stop pin 34 and shoulder 35. By varying the weight 39 or adjusting its position, the speed at which the parts are moving when the stop mechanism becomes active may be varied to suit the conditions under which the mechanism is to be used.

While it is preferred to employ the construction and arrangement of parts shown and described, it will be understood that this construction and arrangement is not essential, and may be varied or modified without departing from the broader features of the invention.

Having explained the nature and object of the invention, and specifically described one form of mechanism in which it may be embodied, what I claim is:—

1. A driving and stopping mechanism, having, in combination, driving mechanism, means for throwing said mechanism into and out of operation, mechanism for continuing the motion of the driven parts at a reduced speed when the driving mechanism is thrown out of operation, and mechanism rendered active by the reduction in speed for throwing out the reduced speed mechanism.

2. A driving and stopping mechanism, having, in combination, driving mechanism, means for throwing said mechanism into and out of operation, mechanism for continuing the motion of the driven parts at a reduced speed, stopping mechanism rendered active by the reduction of speed, and means operated by the stopping mechanism for throwing the reduced speed mechanism out of operation.

3. A driving and stopping mechanism, having, in combination, a friction driving clutch, means under the control of the operator for engaging the clutch, a slow speed clutch, means for engaging the slow speed clutch upon the disengagement of the driving clutch, and stopping mechanism rendered active by the reduction of speed to that of the slow speed clutch for disengaging the slow speed clutch.

4. A driving and stopping mechanism, having, in combination, a driving clutch, means for engaging and disengaging the clutch, a slow speed clutch engaged upon the disengagement of the driving clutch, stopping mechanism rendered active upon the reduction of speed to that imparted by the slow speed clutch, means for disengaging the slow speed clutch from the stopping mechanism, and devices for rendering said latter means inactive upon engaging the driving clutch.

5. A driving and stopping mechanism, having, in combination, a driving clutch, means for engaging and disengaging the driving clutch, a slow speed clutch engaged upon the disengagement of the driving clutch, stopping mechanism including a stop pawl, and a centrifugal governor connected with the driven parts for controlling the action of the stop pawl.

6. A driving and stopping mechanism, having, in combination, a high speed driving clutch, a low speed clutch, means for engaging the low speed clutch upon the disengagement of the driving clutch, a stop shoulder, a stop pawl, a centrifugal governor for controlling the engagement of the stop pawl with the shoulder, and means for disengaging the stop pawl and shoulder upon the arrest of the driven parts.

7. A driving and stopping mechanism, having, in combination, a high speed driving clutch, a low speed clutch, means for engaging the low speed clutch upon the disengagement of the driving clutch, a stop disk, stops for determining the movement of the disk, a shoulder on the disk, a stop pawl connected with the driven parts and arranged to coöperate with the shoulder on the disk, devices for disengaging the slow speed clutch connected with the disk, and devices for disengaging the stop pawl from the shoulder on the disk controlled by the movement of the disk.

8. A driving and stopping mechanism, having, in combination, driving mechanism, means for throwing said mechanism into and out of operation, speed reducing mechanism for reducing the speed of the driven parts when the driving mechanism is thrown out of operation, and mechanism rendered active by the reduction in speed for throwing out the speed reducing mechanism.

9. A driving and stopping mechanism, having, in combination, driving mechanism, speed reducing mechanism for reducing the speed of the driven parts when the driving mechanism is thrown out, and a centrifugal governor for controlling the throwing out of the speed reducing mechanism.

10. A driving and stopping mechanism, having, in combination, variable speed driving mechanism under the control of the operator, speed reducing mechanism for reducing the speed to a predetermined point in stopping the machine, and means for throwing out the speed reducing mechanism including a centrifugal governor.

11. A driving and stopping mechanism, having, in combination, variable speed driving mechanism under the control of the operator, mechanism for continuing the motion of the driven parts at a uniform speed when the driving mechanism is thrown out, and mechanism inactive while the speed of the driven parts is above said uniform speed and rendered active by a reduction to said speed for throwing out the uniform speed mechanism.

12. A driving and stopping mechanism, having, in combination, variable speed driving mechanism under the control of the operator, uniform low speed driving mechanism for continuing the motion of the driven parts when the variable driving mechanism is thrown out, and mechanism inactive so long as the speed is above that of the low speed drive for throwing out the low speed drive and stopping the driven parts.

ERASTUS E. WINKLEY.

Witnesses:
N. D. McPHAIL,
GEORGE E. STEBBINS.